US010164266B2

(12) United States Patent
Konno et al.

(10) Patent No.: US 10,164,266 B2
(45) Date of Patent: Dec. 25, 2018

(54) SEPARATOR INCLUDING TILTED GAS FLOW PATH GROOVES THAT RETAIN WATER BY CAPILLARY FORCE AND FUEL CELL USING THE SAME

(71) Applicant: TOYOTA JIDOSHA KABUSHIKI KAISHA, Toyota-shi, Aichi-ken (JP)

(72) Inventors: Norishige Konno, Toyota (JP); Daisuke Kanno, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 221 days.

(21) Appl. No.: 14/915,339

(22) PCT Filed: Oct. 1, 2014

(86) PCT No.: PCT/JP2014/005012
§ 371 (c)(1),
(2) Date: Feb. 29, 2016

(87) PCT Pub. No.: WO2015/049863
PCT Pub. Date: Apr. 9, 2015

(65) Prior Publication Data
US 2016/0218374 A1 Jul. 28, 2016

(30) Foreign Application Priority Data
Oct. 2, 2013 (JP) .................. 2013-207072

(51) Int. Cl.
*H01M 8/026* (2016.01)
*H01M 8/241* (2016.01)
(Continued)

(52) U.S. Cl.
CPC ......... *H01M 8/026* (2013.01); *H01M 8/0267* (2013.01); *H01M 8/241* (2013.01); *H01M 8/2483* (2016.02); *H01M 2008/1095* (2013.01)

(58) Field of Classification Search
CPC .. H01M 8/026; H01M 8/0267; H01M 8/2483; H01M 8/241
(Continued)

(56) References Cited

U.S. PATENT DOCUMENTS

2002/0064702 A1* 5/2002 Gibb ................... H01M 8/0213
429/492
2002/0192531 A1* 12/2002 Zimmerman ........... F28D 9/005
429/492
(Continued)

FOREIGN PATENT DOCUMENTS

JP          11-176457         7/1999
JP          2006-147309       6/2006
(Continued)

OTHER PUBLICATIONS

Hiroshi Shioyama, "Carbon Materials Used for Polymer Electrolyte Fuel Cells," Handbook of Advanced Ceramics, Chapter 2.11, 2013, pp. 199-210.
(Continued)

*Primary Examiner* — Sean P Cullen
(74) *Attorney, Agent, or Firm* — Finnegan, Henderson, Farabow, Garrett & Dunner, LLP

(57) ABSTRACT

A separator to be used in a fuel cell includes a gas flow path including a plurality of gas flow path grooves that allow reactive gas to flow; a gas discharge hole used for discharging the reactive gas from the gas flow path; and an outlet flow path part positioned between the gas discharge hole and the gas flow path and used for flowing the reactive gas discharged from the gas flow path into the gas discharge hole. The plurality of gas flow path grooves includes a coupling flow path part coupled to the outlet flow path part. The coupling flow path part includes tilted gas flow path grooves tilted from a direction of gravitational force. A groove width of the tilted gas flow path groove in the
(Continued)

coupling flow path part is set such that a force of a wall surface of the tilted gas flow path groove to retain water by means of a surface tension of the water is larger than a force applied to the water by the gravitational force.

2 Claims, 8 Drawing Sheets

(51) Int. Cl.
    *H01M 8/0267* (2016.01)
    *H01M 8/1018* (2016.01)
    *H01M 8/2483* (2016.01)

(58) Field of Classification Search
    USPC .................................................. 429/457, 514
    See application file for complete search history.

(56) References Cited

U.S. PATENT DOCUMENTS

| | | |
|---|---|---|
| 2003/0027030 A1 | 2/2003 | Kawashima et al. |
| 2003/0211376 A1* | 11/2003 | Hatoh .................. H01M 4/8605 |
| | | 429/431 |
| 2004/0110056 A1 | 6/2004 | Hatoh et al. |
| 2004/0157100 A1 | 8/2004 | Mizuno |
| 2006/0216572 A1 | 9/2006 | Yoshida et al. |
| 2009/0029228 A1 | 1/2009 | Shibata et al. |
| 2009/0243147 A1* | 10/2009 | Iino ..................... H01M 8/0213 |
| | | 264/250 |
| 2010/0047650 A1* | 2/2010 | Iino ..................... H01M 8/0213 |
| | | 429/479 |
| 2014/0087287 A1* | 3/2014 | Suzuki ................ H01M 8/0228 |
| | | 429/479 |

FOREIGN PATENT DOCUMENTS

| | | |
|---|---|---|
| JP | 2010-182515 | 8/2010 |
| JP | 2012-150964 | 8/2012 |
| WO | WO 2007/088832 A1 | 8/2007 |

OTHER PUBLICATIONS

M. Murthy et al., "Proton Conducting Membrane Fuel Cells IV," Proceedings of the International Symposium, The Electrochemical Society, Inc., Proceedings of the International Symposium, vol. 2004-21, 2006, p. 94.

James Larminie, "Fuel Cell Systems Explained," Wiley, 2003, pp. 94-95.

* cited by examiner

SEPARATOR INCLUDING TILTED GAS FLOW PATH GROOVES THAT RETAIN WATER BY CAPILLARY FORCE AND FUEL CELL USING THE SAME

CROSS REFERENCE TO RELATED APPLICATION

This application claims priority based on Japanese Patent Application No. 2013-207072 filed on Oct. 2, 2013, the disclosure of which is incorporated herein by reference in its entirety.

TECHNICAL FIELD

This invention relates to a separator used in a fuel cell.

BACKGROUND ART

A fuel cell generally has a stack structure including a plurality of stacked unit cells. Each unit cell has a structure where a membrane electrode assembly and a separator are disposed to face each other and a gas flow path is disposed between the membrane electrode assembly and the separator. The gas flow path is used for supplying reactive gas along a surface of the membrane electrode assembly. For example, the gas flow path is formed in a manner such that the reactive gas flows from a supply hole for the reactive gas provided in an outer edge portion of the separator, passes along the entire surface of the membrane electrode assembly, and travels toward a discharge hole provided in another outer edge portion opposite to the outer edge portion where the supply hole is provided. For example, patent literature 1 teaches a separator including gas passage grooves and a communication groove interconnecting adjacent portions of the gas passage grooves. The communication groove is shallower than the gas passage grooves.

PRIOR ART LITERATURE

Patent Literature

Patent Literature 1: WO2007/088832A

SUMMARY OF INVENTION

Problem to be Solved by Invention

The separator of patent literature 1 is to relieve blockage of a gas flow path due to condensed water. However, this structure may find difficulty in satisfying various required capabilities such as a surface pressure that can be applied from the separator to the membrane electrode assembly, characteristics of distributing gas to a plurality of unit cells, and pressure loss in the gas flow path. Regarding the surface pressure, for example, the structure of patent literature 1 may fail to obtain an applicable surface pressure due to reduction in a contact area of the separator. Regarding the characteristics of distributing gas and the pressure loss in the gas flow path, for example, even if there is water remaining in a part of the flow path, the presence of the communication groove makes it hard to apply a differential pressure across the remaining water. This makes it difficult to assure drainage performance, and changes pressure loss in the gas flow path of a corresponding unit cell, possibly causing a problem of degrading the characteristics of distributing gas to a plurality of stacked unit cells. Additionally, while a fuel cell is operated at a high load, intended power generation performance is hard to obtain through operation with a stoichiometric ratio near its limit. This makes it difficult to satisfy the required capabilities in some cases. The stoichiometric ratio is a ratio of the amount of actually supplied gas to a minimum required amount of gas for the power generation of the fuel cell (specifically, the amount of gas to be used for electrochemical reaction). Specifically, the structure of the separator of patent literature 1 may damage the aforementioned required capabilities such as the applicable surface pressure, the characteristics of distributing gas, and the pressure loss.

The conventional separator may have a structure with a connection flow path provided between the gas flow path and the discharge hole for the reactive gas in addition to the aforementioned structure with the gas passage grooves. In this separator, water remaining in the gas flow path may move to the connection flow path and stay therein while the operation of a fuel cell is stopped. In this case, when the fuel cell is to be actuated in a sub-zero temperature environment, the water staying in the connection flow path may freeze to block the connection flow path. Patent literature 1 does not describe or suggest the aforementioned structure with the connection flow path.

As understood from above, there is desired a technique to reduce the probability of blockage of a connection flow path due to freezing of water staying in the connection flow path while avoiding excessive damage on various required capabilities such as a surface pressure that can be applied to a membrane electrode assembly, characteristics of distributing gas, and pressure loss.

Solution to Problem

This invention has been made to solve at least some of the aforementioned problems. This invention can be implemented in the following aspects.

(1) According to an aspect of the invention, there is provided a separator to be used in a fuel cell. The separator includes: a gas flow path including a plurality of gas flow path grooves that allow reactive gas to flow; a gas discharge hole used for discharging the reactive gas from the gas flow path; and an outlet flow path part positioned between the gas discharge hole and the gas flow path and used for flowing the reactive gas discharged from the gas flow path into the gas discharge hole. The plurality of gas flow path grooves includes a coupling flow path part coupled to the outlet flow path part. The coupling flow path part includes tilted gas flow path grooves tilted from a direction of gravitational force. A groove width of the tilted gas flow path groove in the coupling flow path part is set such that a force of a wall surface of the tilted gas flow path groove to retain water by means of a surface tension of the water is larger than a force applied to the water by the gravitational force.

According to the separator of this aspect, remaining water in the tilted gas flow path grooves can be retained so as not to move toward the reactive gas discharge hole. This can make the water less likely to remain in the outlet flow path part while satisfying other required capability. As a result, at the time of startup in a sub-zero temperature condition, at least the possibility of blockage due to freezing occurring in the outlet flow path part can be reduced.

(2) In the above aspect, a groove width of gas flow path grooves in the outlet flow path part may be set such that a force of a wall surface of the gas flow path groove in the outlet flow path part to retain water by means of a surface tension of the water is smaller than a force of a wall surface of a gas flow path groove in the coupling flow path part to retain the water.

According to the separator of this aspect, remaining water can be guided from the outlet flow path part toward the coupling flow path part by means of capillary action. As a result, the probability of blockage due to freezing occurring in the outlet flow path part can be reduced.

This invention can be implemented in various aspects in addition to the separator of the aforementioned aspect. For example, this invention can be implemented in aspects such as a unit cell of a fuel cell including the separator of the aforementioned aspect, a fuel cell including this unit cell, and a fuel cell system including this fuel cell.

DESCRIPTION OF EMBODIMENTS

A. First Embodiment

Figure 1:
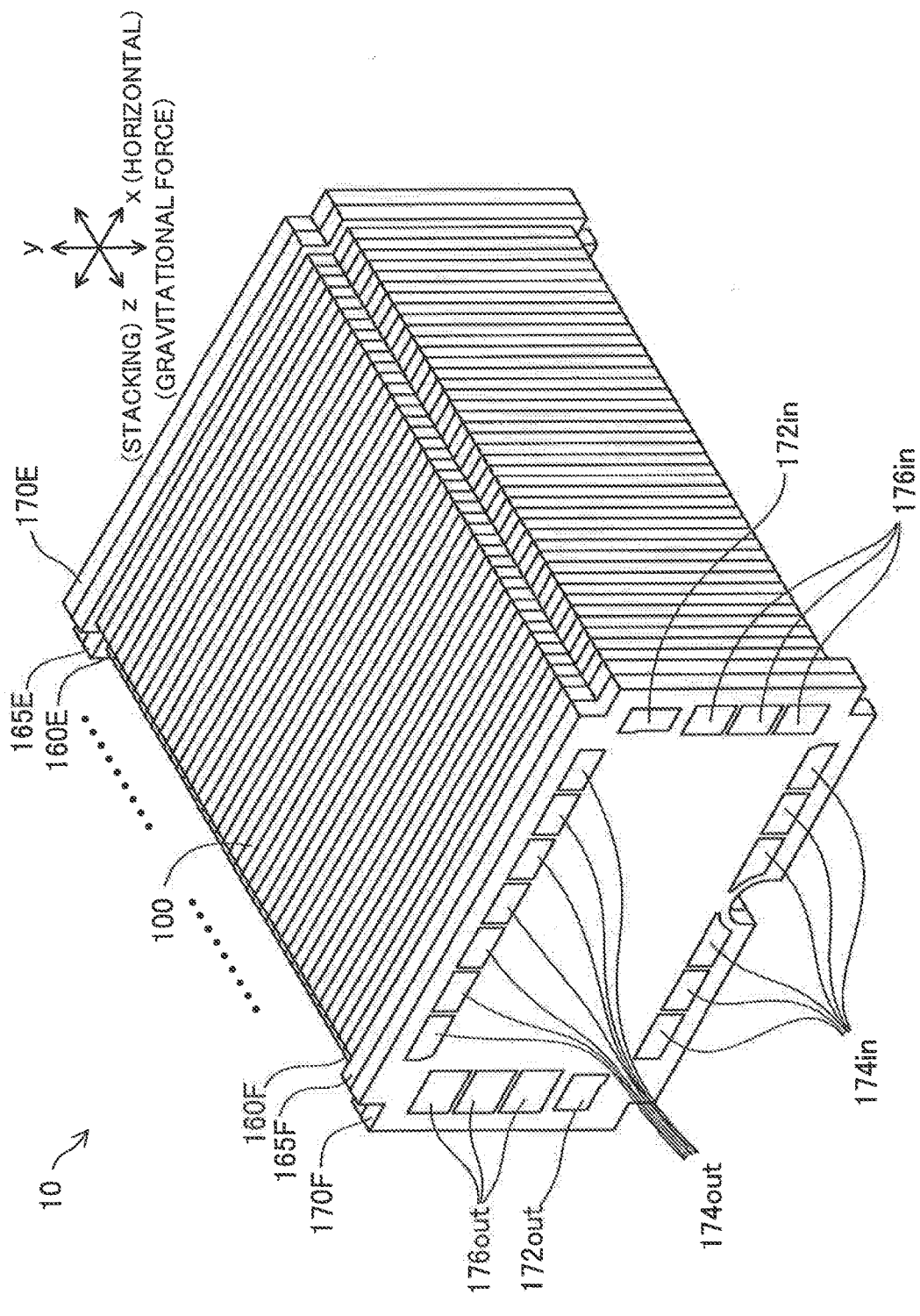
FIG. 1 is a schematic perspective view showing the structure of a fuel cell according to a first embodiment.

FIG. 1 is a schematic perspective view showing the structure of a fuel cell 10. The fuel cell 10 has a stack structure including a plurality of unit cells 100 stacked in a Z direction corresponding to a horizontal direction (hereinafter also called a "stacking direction"), and a pair of end plates 170F and 170E holding the unit cells 100 therebetween. Between the end plate 170F on a front end side and the unit cells 100, there is provided a terminal plate 160F on the front end side with intervention of an insulating plate 165F on the front end side. Likewise, between the end plate 170E on a rear end side and the unit cells 100, there is provided a terminal plate 160E on the rear end side with intervention of an insulating plate 165E on the rear end side. The unit cells 100, the terminal plates 160F and 160E, the insulating plates 165F and 165E, and the end plates 170F and 170E each have a plate-like structure of a substantially rectangular outer shape and are disposed in a manner such that their long sides extend in an X direction (horizontal direction) and their short sides extend in a Y direction (direction of gravitational force or vertical direction).

Each of the end plate 170F, the insulating plate 165F, and the terminal plate 160F on the front end side is provided with a fuel gas supply hole 172in, a fuel gas discharge hole 172out, a plurality of oxidizing gas supply holes 174in, a plurality of oxidizing gas discharge holes 174out, a plurality of cooling water supply holes 176in, and a plurality of cooling water discharge holes 176out. These supply holes and discharge holes are coupled to equivalent holes (not shown in the drawings) provided in corresponding positions of each unit cell 100 to form a supply manifold and a discharge manifold for corresponding gas or cooling water. Meanwhile, each of the end plate 170E, the insulating plate 165E, and the terminal plate 160E on the rear end side is not provided with these supply holes and discharge holes.

This is for the reason that the fuel cell 10 is of a type of supplying reactive gases (fuel gas and oxidizing gas) and cooling water from the end plate 170F on the front end side to each unit cell 100 through the supply manifold while discharging exhaust gas and drainage water from each unit cell 100 to the outside from the end plate 170F on the front end side through the discharge manifold. However, this is not the only type of the fuel cell 10. The fuel cell 10 can also be configured as a fuel cell of various types such as a type of supplying reactive gas and cooling water from the end plate 170F on the front end side and discharging exhaust gas and drainage water to the outside from the end plate 170E on the rear end side, for example.

The plurality of oxidizing gas supply holes 174in are provided and arranged in the X direction (long-side direction) in an outer edge portion at the lower end of the end plate 170F on the front end side. The plurality of oxidizing gas discharge holes 174out are provided and arranged in the X direction in an outer edge portion at the upper end of the end plate 170F. The fuel gas supply hole 172in is provided in an upper end part in the Y direction (short-side direction) of an outer edge portion at the right end of the end plate 170F on the front end side. The fuel gas discharge hole 172out is provided in a lower end part in the Y direction of an outer edge portion at the left end of the end plate 170F. The plurality of cooling water supply holes 176in are provided and arranged in the Y direction below the fuel gas supply hole 172in. The plurality of cooling water discharge holes 176out are provided and arranged in the Y direction above the fuel gas discharge hole 172out.

The terminal plate 160F on the front end side and the terminal plate 160E on the rear end side are current collecting plates that collect power generated in each unit cell 100 and are used to output the collected power to the outside through a terminal not shown in the drawings.

Figure 2:
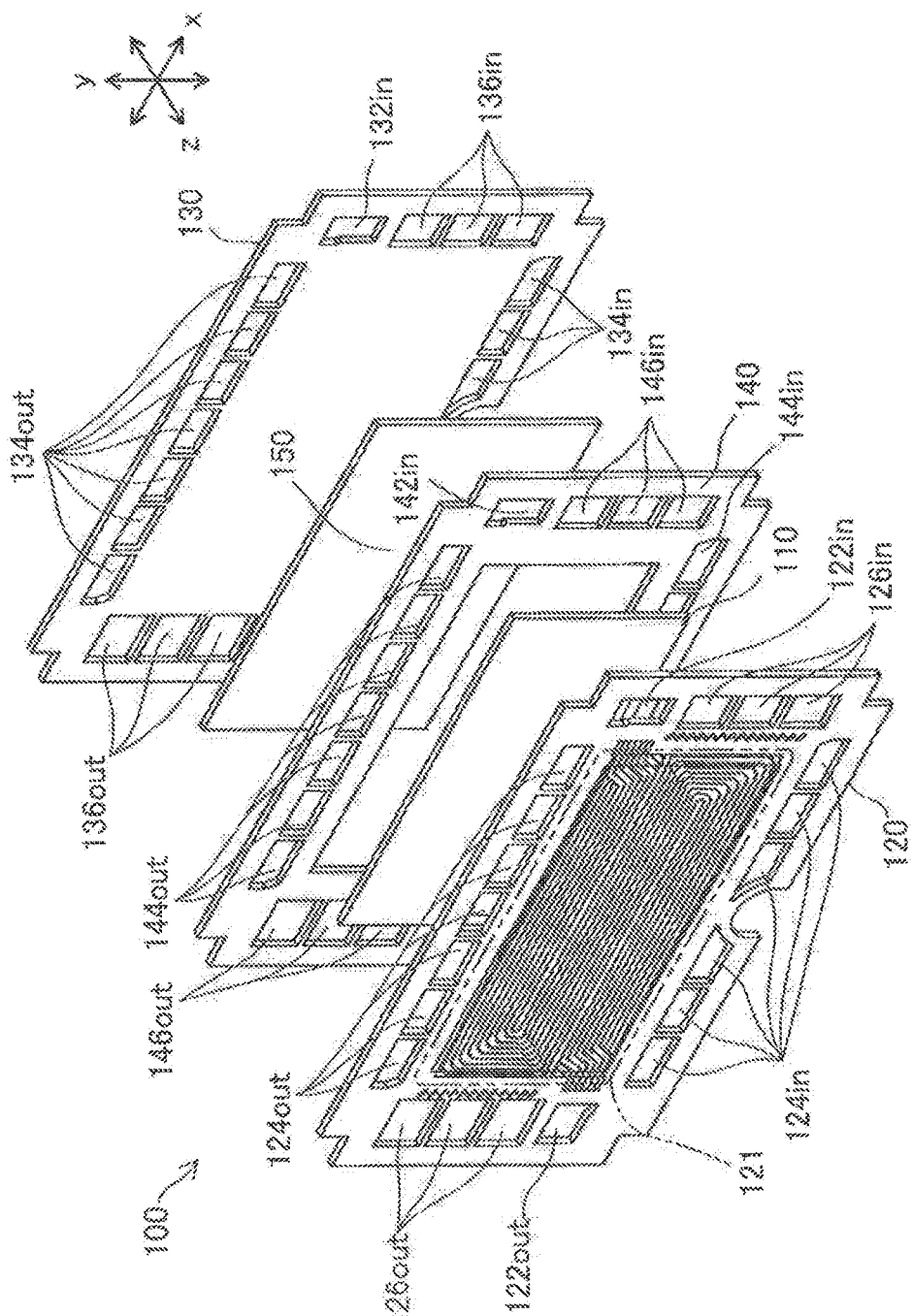
FIG. 2 is a schematic perspective view showing the structure of a unit cell in a decomposed manner.

FIG. 2 is a schematic perspective view showing the structure of the unit cell 100 in an exploded manner. The unit cell 100 includes a membrane electrode and gas diffusion layer assembly (MEGA) 110, an anode-side separator 120 and a cathode-side separator 130 on opposite sides of the MEGA 110 and holding the MEGA 110 therebetween, a gas flow path member 150 interposed between the cathode-side separator 130 and the MEGA 110, and a sealing member 140 covering the outer periphery of the MEGA 110.

The MEGA 110 is a power generator including a membrane electrode assembly (MEA) with a pair of catalyst electrode layers formed on opposite sides of an electrolyte membrane and a pair of gas diffusion layers formed on opposite sides of the membrane electrode assembly. The MEGA is also called MEA in some cases.

The anode-side separator 120 and the cathode-side separator 130 are each formed of a member having gas barrier property and electron conductivity. For example, the anode-side separator 120 and the cathode-side separator 130 are each formed of a carbon member such as compact carbon impermeable to gas prepared by compressing carbon particles or a metal member such as stainless steel or titanium.

As described later, the anode-side separator 120 is provided with a groove-like fuel gas flow path formed on a surface facing the MEGA 110 and a groove-like cooling water flow path formed on an opposite surface.

The anode-side separator 120 is provided with the following holes corresponding to the aforementioned supply holes and discharge holes forming the manifolds: a fuel gas supply hole 122in, a fuel gas discharge hole 122out, a plurality of oxidizing gas supply holes 124in, a plurality of oxidizing gas discharge holes 124out, a plurality of cooling water supply holes 126in, and a plurality of cooling water discharge holes 126out.

Likewise, the cathode-side separator 130 is provided with a fuel gas supply hole 132in, a fuel gas discharge hole (not shown in the drawings), a plurality of oxidizing gas supply holes 134in, a plurality of oxidizing gas discharge holes (not shown in the drawings), a plurality of cooling water supply holes 136in, and a plurality of cooling water discharge holes 136out. Likewise, the sealing member 140 is provided with the following holes corresponding to the supply holes and the discharge holes in the anode-side separator 120: a fuel gas supply hole 142in, a fuel gas discharge hole (not shown in the drawings), a plurality of oxidizing gas supply holes 144in, a plurality of oxidizing gas discharge holes (not shown in the drawings), a plurality of cooling water supply holes 146in, and a plurality of cooling water discharge holes 146out.

The gas flow path member 150 forms a gas flow path which allows oxidizing gas supplied through the oxidizing gas supply holes 134in in the cathode-separator 130 to flow in the in-plane direction of the MEGA 110 (XY-plane direction) and discharged through the oxidizing gas discharge holes 134out. For example, the gas flow path member 150 is formed of a porous material having gas diffusion properties and conductivity such as a metal porous body (expanded metal, for example).

Figure 3:
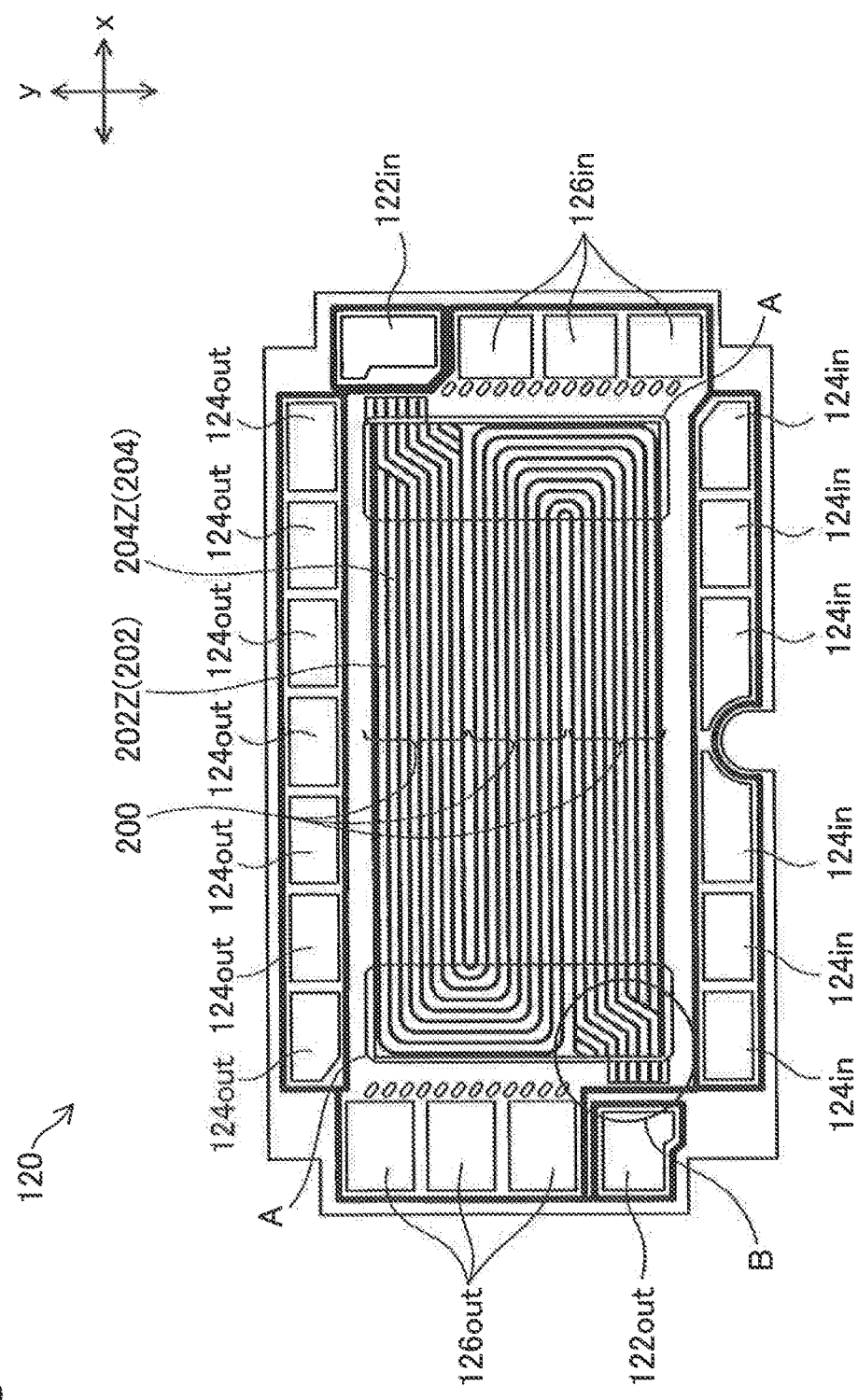
FIG. 3 is a schematic plan view showing the structure of an anode-side separator.

FIG. 3 is a schematic plan view showing the structure of the anode-side separator 120. FIG. 3 shows a state as viewed from a direction of a surface of the anode-side separator 120 facing an adjacent different unit cell 100 adjacent to this anode-side separator 120 and through which a coolant flows (hereinafter also called a "cooling surface"). A surface opposite the cooling surface and facing the MEGA 110 is also called a "gas circulation surface." As described above, the outer peripheral portion of the anode-side separator 120 is provided with the following holes as the supply holes and the discharge holes for reactive gas and cooling water: the fuel gas supply hole 122in, the fuel gas discharge hole 122out, the plurality of oxidizing gas supply holes 124in, the plurality of oxidizing gas discharge holes 124out, the plurality of cooling water supply holes 126in, and the plurality of cooling water discharge holes 126out.

As shown in FIG. 2, an inner flow path forming region 121 (FIG. 1), formed at an inner side of these supply holes and discharge holes, has a patterned indented cross-sectional shape (undulated cross-sectional shape) including projections 202Z and depressions 204Z (also called "grooves 204Z") formed alternately on the cooling surface side. This patterned indented cross-sectional shape is formed by press working on a flat plate, for example. The rear side of the projections 202Z at the cooling surface forms fuel gas flow path grooves 202 on the gas circulation surface. The rear side of the grooves 204Z at the cooling surface forms ribs 204 for partitioning the fuel gas flow path grooves 202 on the gas circulation surface. The grooves 204Z at the cooling surface function as cooling water flow path grooves (hereinafter also called "cooling water flow path grooves 204Z"). A fuel gas flow path 200 made up of a plurality of fuel gas flow path grooves 202 is formed on the gas circulation surface to be arranged in a serpentine pattern from the fuel gas supply hole 122in toward the fuel gas discharge hole 122out.

In the following description, a reference sign including a numeral and subsequent "Z" indicates a member or a part at the cooling surface, and a reference sign including the same numeral but not including subsequent "Z" indicates its rear part on the rear side of the cooling surface.

On the cooling surface side shown in FIG. 3, the projections 202Z function as ribs for partitioning the cooling water flow path grooves 204Z. Thus, if a region A in the left end area of FIG. 3 also has the projections 202Z each of which is formed as a constant-height rib, the projections 202Z may become walls to cause the problem of disturbing the flow of cooling water from the cooling water supply holes 126in toward the cooling water discharge holes 126out. This problem is prevented by forming the projections 202Z in this region into the following structure.

Figure 4:
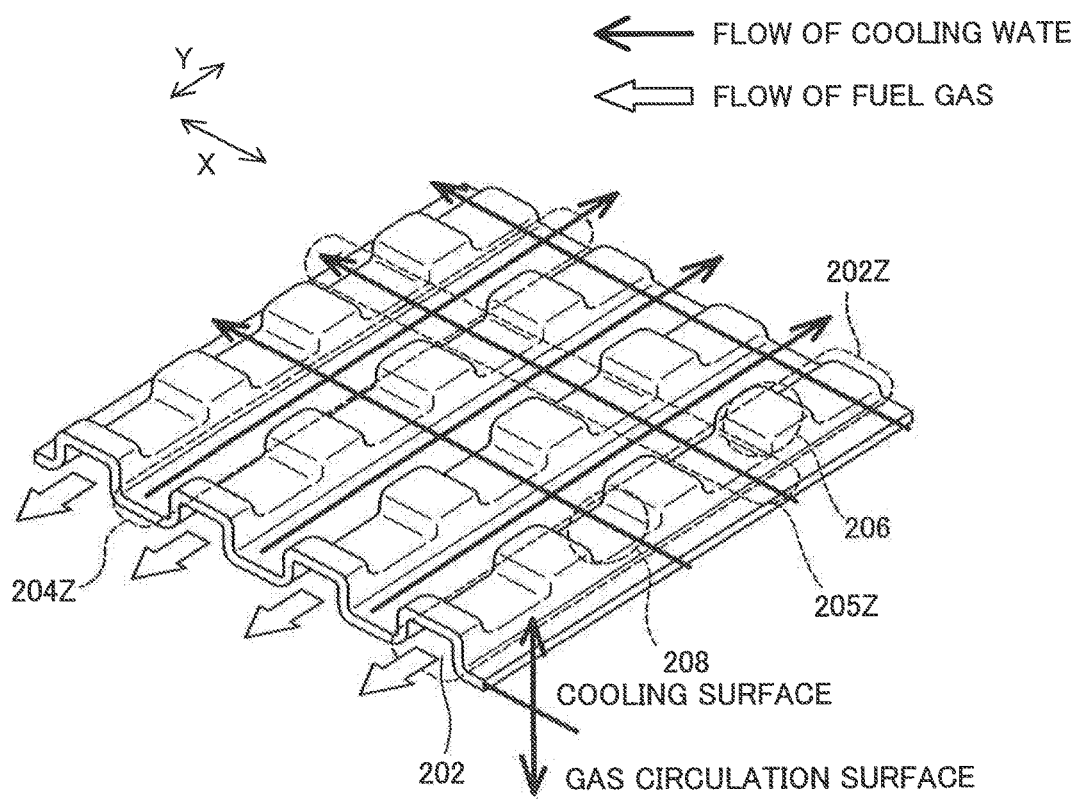
FIG. 4 is an enlarged schematic perspective view showing a part of a fuel gas flow path.

FIG. 4 is an enlarged schematic perspective view showing some of the fuel gas flow path grooves 202 extending in the Y direction as a part of the fuel gas flow path 200 in the region A shown in FIG. 3. In FIG. 4, the upside is the cooling surface side and the downside is the gas circulation surface side. At the gas circulation surface, the fuel gas flow path grooves 202 formed to extend in the Y direction are each provided with shallow groove portions 208. The shallow groove portions 208 are shallower than the other portions (hereinafter also called "deep groove portions 206"). The depth of the fuel gas flow path groove 202 mentioned herein means a distance from the position of a part of the gas circulation surface of the anode-side separator 120 contacting the MEGA 110 to the bottom of the fuel gas flow path groove 202. Thus, the depth of the fuel gas flow path groove 202 is large in the position of the deep groove portion 206 and small in the position of the shallow groove portion 208. The fuel gas flow path groove 202 includes the shallow groove portions 208 and the deep groove portions 206 arranged in the Y direction.

Both the shallow groove portions 208 and the deep groove portions 206 do not contact the MEGA110, thereby forming a fuel gas flow path that allows fuel gas to flow along the fuel gas flow path groove 202.

In the fuel cell 10 (see FIGS. 1 and 2) including the plurality of stacked unit cells 100, the cooling surface of the anode-side separator 120 contacts a surface of the cathode-side separator of an adjacent unit cell 100 at the rear side of the deep groove portions 206 but does not contact at the rear side of the shallow groove portions 208. As a result, communication flow path grooves 205Z are formed between the rear side of the shallow groove portions 208 of the anode-side separator 120 and the surface of the cathode-side separator 130 such that the communication flow path grooves 205Z interconnect every two adjacent cooling water flow path grooves 204Z adjacent to the rear side of each shallow groove portion 208. This structure allows cooling water to flow not only in the Y direction (direction of gravitational force) along the cooling water flow path grooves 204Z but also in the X direction (horizontal direction) through the communication flow path groove 205Z. In this way, the projections 202Z extending in the Y direction can be prevented from blocking flow of cooling water in the X direction.

Though not shown in the drawings, the fuel gas flow path grooves 202 extending in the X direction in the region A shown in FIG. 3 are preferably also provided with the shallow groove portions 208. This can prevent the projections 202Z extending in the X direction from blocking flow of cooling water in the Y direction.

Though not shown in the drawings, not only are the fuel gas flow path grooves 202 extending in the X and Y directions but also the fuel gas flow path grooves 202 extending in directions oblique to the X and Y directions are preferably also provided with the shallow groove portions 208. This can prevent the projections 202Z from blocking flow of cooling water in the X or Y direction.

As described above, on the cooling surface of the anode-side separator 120, cooling water supplied from the cooling water supply holes 126in can be caused to flow toward the cooling water discharge holes 126out without being blocked by the projections 202Z.

Figure 5:
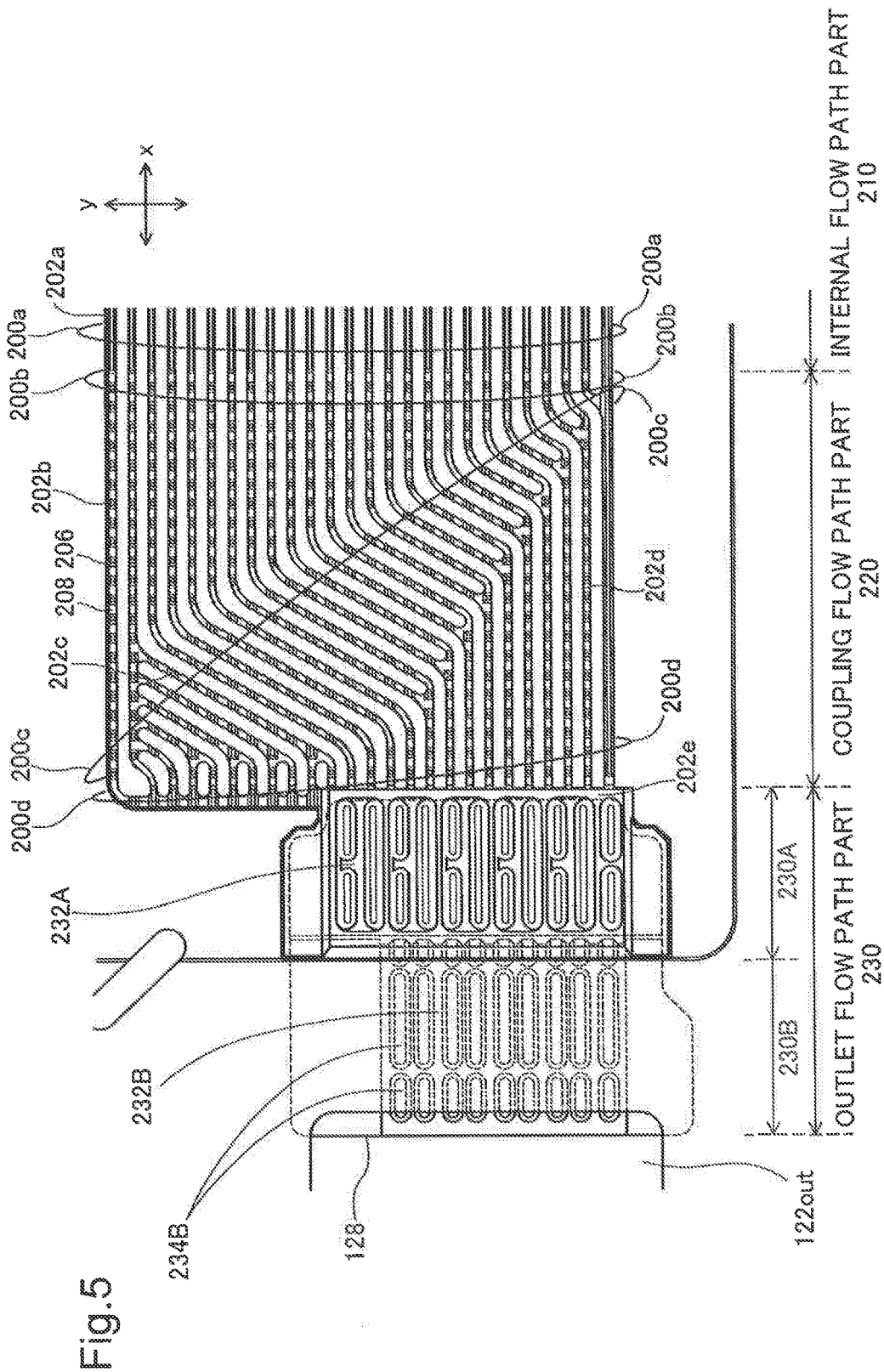
FIG. 5 is an enlarged schematic plan view showing an exit-side region of the fuel gas flow path communicating with a fuel gas discharge hole.

FIG. 5 is an enlarged schematic plan view showing an exit-side region (region B of FIG. 3) communicating with the fuel gas discharge hole 122out as a part of the fuel gas flow path 200 of FIG. 3. The fuel gas flow path 200 in the exit-side region communicating with the fuel gas discharge hole 122out is formed of an outlet flow path part 230 directly communicating with the fuel gas discharge hole 122out and a coupling flow path part 220 between the outlet flow path part 230 and an internal flow path part 210. The internal flow path part 210 has fuel gas flow path grooves 202a. The coupling flow path part 220 has fuel gas flow path grooves 202b-202e. Like FIG. 3, FIG. 5 shows the cooling surface side, so that the fuel gas flow path grooves 202a-202e are illustrated as projections of their rear sides.

The coupling flow path part 220 is formed of a first coupling flow path section 200b communicating with a fuel gas flow path section 200a in the internal flow path part 210, a second coupling flow path section 200c communicating with the first coupling flow path section 200b, a third coupling flow path section 200d communicating with the second coupling flow path section 200c, and a boundary flow path groove 202e coupling the third coupling flow path section 200d and the outlet flow path part 230. The fuel gas flow path section 200a in the internal flow path part 210 has a plurality of fuel gas flow path grooves 202a extending in the X direction. The first coupling flow path section 200b is formed of a plurality of first coupling flow path grooves 202b extending in the X direction and communicating with the plurality of fuel gas flow path grooves 202a in the fuel gas flow path section 200a. The second coupling flow path section 200c is formed of a plurality of second coupling flow path grooves 202c (also called "tilted gas flow path groove portions 202c") extending downward from the first coupling flow path grooves 202b in a direction tilted from the direction of gravitational force. The third coupling flow path section 200d is formed of a plurality of third coupling flow path grooves 202d extending in the X direction and communicating with the boundary flow path groove 202e and the second coupling flow path grooves 202c. The boundary flow path groove 202e extends in the Y direction at a boundary between the third coupling flow path section 200d and the outlet flow path part 230. Like the fuel gas flow path grooves shown in FIG. 4, the coupling flow path grooves 202b, 202c, and 202d forming the coupling flow path part 220 all have the shallow groove portions 208. The respective rear sides of these shallow groove portions 208 form a communication flow path that allows cooling water to flow along the cooling surface.

The outlet flow path part 230 is formed of a first outlet flow path section 230A communicating with the boundary flow path groove 202e, and a second outlet flow path section 230B communicating with the first outlet flow path section 230A and the fuel gas discharge hole 122out. The outlet flow path sections 230A and 230B are formed between the gas circulation surface of the anode-side separator 120 and a sealing plate 128 disposed on the gas circulation surface of the anode-side separator 120. The first outlet flow path section 230A has first outlet flow path grooves 232A formed at the gas circulation surface of the anode-side separator 120. The first outlet flow path grooves 232A are formed to have a substantially comb-like shape communicating with the boundary flow path groove 202e. The surface of sealing plate 128 is provided a plurality of projections 234B extending in the X direction. The second outlet flow path section 230B is made up of a plurality of second outlet flow path grooves 232B forming substantially comb-like flow paths between the projections 234B.

Though not shown in the drawings and will not be described, like the exit-side region, an entry-side region being a part of the fuel gas flow path 200 and communicating with the fuel gas supply hole 122in is preferably also formed of an inlet flow path part communicating with the fuel gas supply hole 122in and a coupling flow path part between the inlet flow path part and the internal flow path part.

As described below, one of characteristics of the anode-side separator 120 lies in the structure of the coupling flow path part 220 communicating with the outlet flow path part 230.

Figure 6:
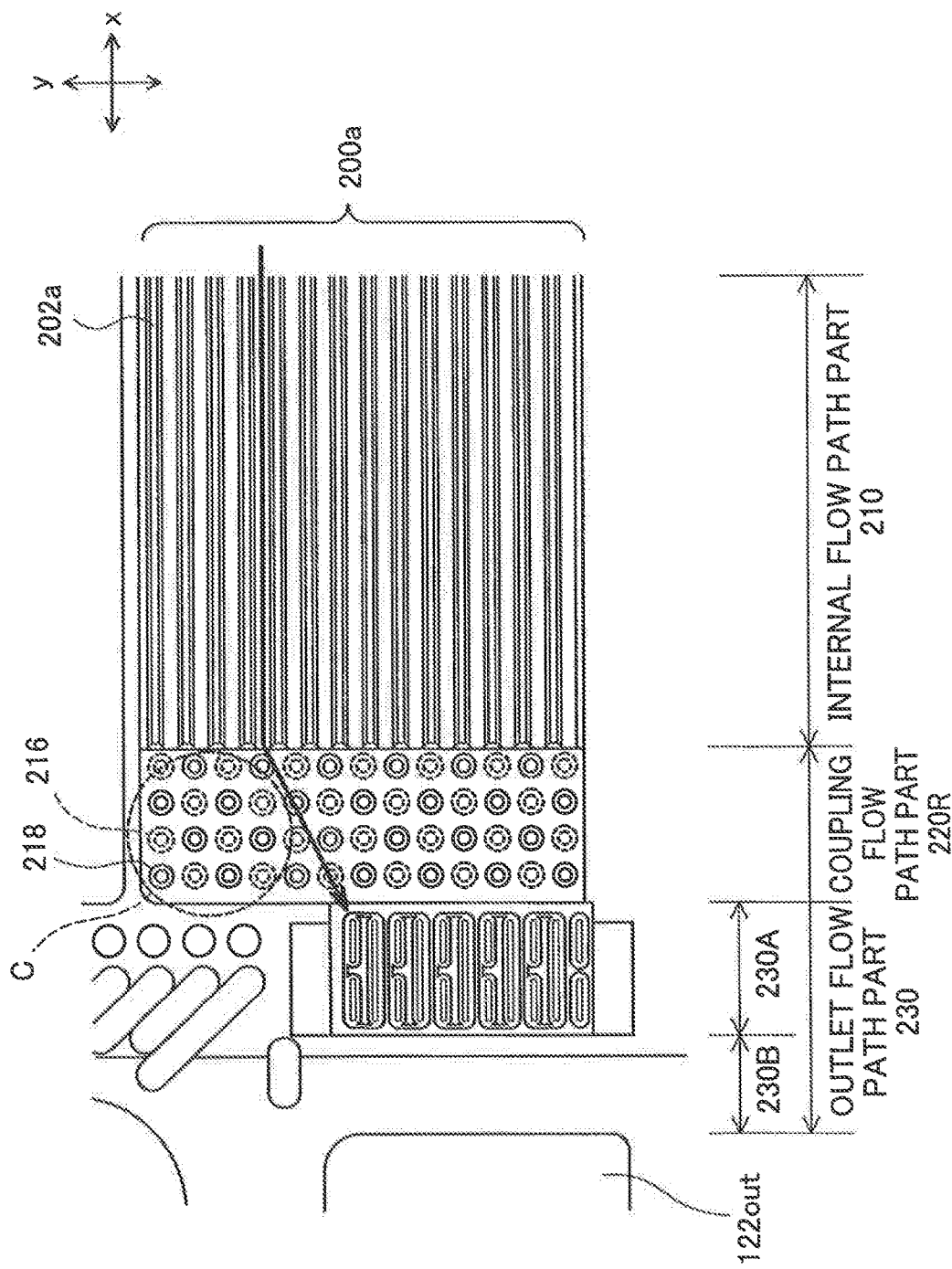
FIG. 6 is a schematic plan view showing a coupling flow path part of Comparative Example.
Figure 7:
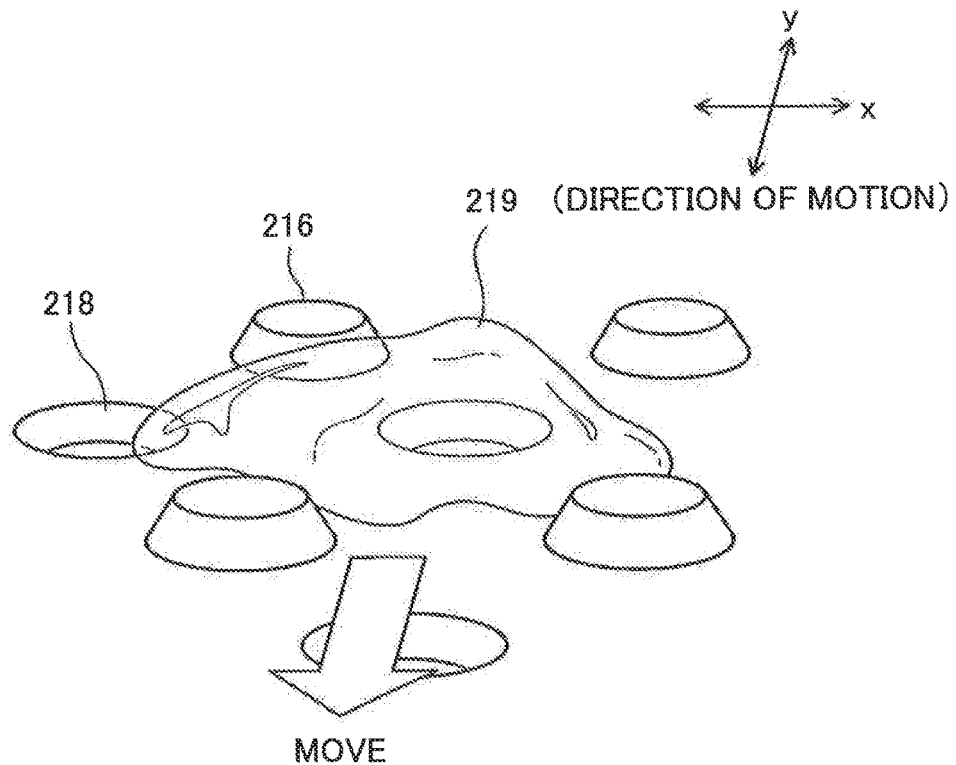
FIG. 7 is an enlarged schematic perspective view showing a part of the coupling flow path part of FIG. 6 as viewed from a gas circulation surface side.

FIG. 6 is a schematic plan view showing a coupling flow path part 220R of Comparative Example. FIG. 7 is an enlarged schematic perspective view showing a part of the coupling flow path part 220R of FIG. 6 as viewed from the gas circulation surface side. The coupling flow path part 220R is formed of a plurality of embosses 216 as projections and a plurality of dimples 218 as depressions arranged alternately and separately. The structure of the internal flow path part 210 and that of the outlet flow path part 230 coupled through with the coupling flow path part 220R are the same as with the coupling flow path part 220 of the aforementioned embodiment.

With the structure of the coupling flow path part 220R where the dimples 218 are arranged to be separated from each other, fuel gas flowing in the upper side of the internal flow path part 210 in the Y direction (indicated by a solid arrow in FIG. 6) easily travels toward the outlet flow path part 230. This makes water easily stay in an upper region C of the coupling flow path part 220R while making it difficult to discharge the water even through scavenging gas is flowed before the operation is stopped. Further, in the structure with the dimples 218 and the embosses 216, remaining water 219 does not contact a large area of wall surfaces of the dimples 218 and those of the embosses 216, as shown in FIG. 7. Thus, in a flow path formed of the dimples 218 in the coupling flow path part 220R, force of moving up water by means of capillary action (also called "capillary force") is smaller than gravitational force applied to the water. The capillary force can be expressed using a liquid surface height h obtained by the following formula (1). This capillary force corresponds to the force of a wall surface of a gas flow path groove retaining water that is determined based on the surface tension of the water.

$$h = 2 \cdot T \cdot \cos \theta / (\rho \cdot g \cdot r) \quad (1)$$

where T is a surface tension, θ is a contact angle, ρ is a liquid density, g is gravitational acceleration, and r is the internal diameter of a tube.

The "tube inner diameter r" of a flow path having a non-circular cross section corresponds to the diameter of a circle having the same area as the cross-sectional area of the flow path. In the case of the structure with dimples, as a result of the relatively large inner diameter r, the liquid surface height h becomes relatively small, and the capillary force becomes relatively small.

Thus, while the operation is stopped, the remaining water 219 in the upper region C moves downward (direction of gravitational force) in the coupling flow path part 220R as shown by an arrow of FIG. 7. The water having moved easily stays in the outlet flow path part 230. If the water staying in the outlet flow path part 230 freezes, that blocks the outlet flow path part 230 and the fuel gas flow path. This might cause a risk such as a failure of the operation of the fuel cell 10.

In contrast, the coupling flow path part 220 (FIG. 5) of the aforementioned embodiment can make water less likely to move toward the outlet flow path part 230 as described below.

Figure 8:
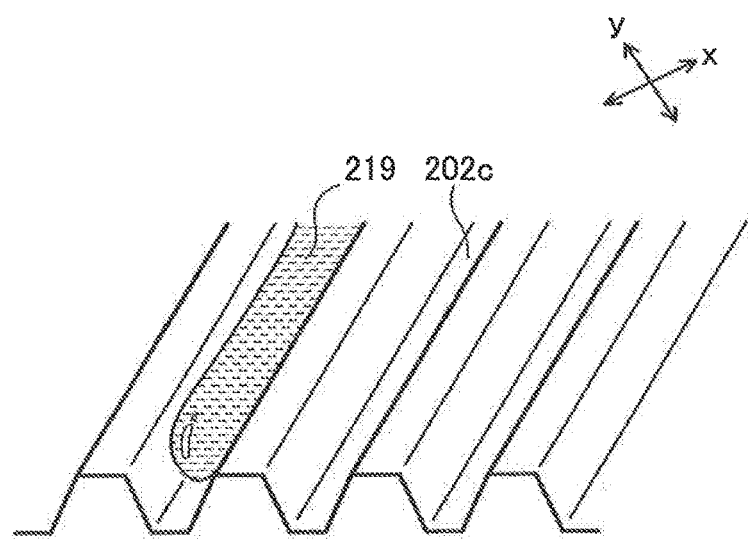
FIG. 8 is an enlarged schematic perspective view showing a part of a second coupling flow path section forming a coupling flow path part of the embodiment as viewed from the gas circulation surface side.

FIG. 8 shows a part of the second coupling flow path section 200c of FIG. 5 in an enlarged manner as viewed from the gas circulation surface side. In this case, compared to the Comparative Example, water contacts a large area of a wall surface while the cross-sectional area of the flow path is reduced. This reduces the tube inner diameter r, making it possible to increase the capillary force. In particular, the width of the second coupling flow path grooves 202c extending in a direction tilted from the direction of gravitational force is preferably set in such a manner as to make capillary force F of the second coupling flow path grooves 202c larger than gravitational force, even if the second coupling flow path grooves 202c is full of water. In particular, in consideration of downward force cc resulting from vibration in addition to force g resulting from gravitational force, the width of the second coupling flow path grooves 202c is preferably set in such a manner as to make the capillary force F larger than the total of these forces (g+α). In this case, the vibration force α may be set at a predetermined value assumed in an environment where the fuel cell 10 is used. In addition to the groove width, a groove depth is preferably set in such a manner as to satisfy these purposes. Further, the width and the depth of the first coupling flow path grooves 202b and those of the third coupling flow path grooves 202d are preferably set at values same as the width and the depth of the second coupling flow path grooves 202c. If a groove depth is set at a predetermined fixed value, the width of the second coupling flow path grooves 202c can be set at a preferable value and the respective widths of the first and third coupling flow path grooves 202b and 202d can be set to conform to this preferable value. By doing so, even if water not having been discharged through scavenging remains in the second coupling flow path grooves 202c, as shown in FIG. 8, this remaining water can be retained so as not to move toward the outlet flow path part 230.

The gas diffusion layer in the MEGA 110 (see FIG. 2) contacts the fuel gas flow path 200 including the coupling flow path part 220. Thus, even if the coupling flow path part 220 is blocked due to freezing of remaining water, fuel gas still flows through the gas diffusion layer. This prevents the fuel gas flow paths from being blocked entirely. In contrast, since the gas diffusion layer does not contact the outlet flow path part 230, if remaining water exists in large amount in the outlet flow path part 230 like in Comparative Example described above, freezing of the remaining water might block the fuel gas flow paths entirely.

As described above, in this embodiment, the coupling flow path part 220 can retain water so as to prevent the water from moving toward the outlet flow path part 230. This can reduce the probability of blockage of the outlet flow path part 230 due to freezing of water staying in the outlet flow path part 230 to occur when the operation of the fuel cell 10 is started in a sub-zero temperature condition, so that the fuel gas flow path can be less likely to be blocked entirely. Unlike in the separator of the structure referred to in the description of the background art, the probability of blockage of the outlet flow path part 230 can be reduced while required capabilities such as an applicable surface pressure, characteristics of distributing gas, and pressure loss are satisfied without being damaged excessively. Additionally, like in the case of performing generally-employed process of making a surface of a flow path groove water repellent, effect of making blockage less likely is not reduced successively. Meanwhile, the process of making a surface water repellent or hydrophilic may be performed, where appropriate.

B. Second Embodiment

The gas flow path groove structure described in the first embodiment allows retention of remaining water. A separator of a second embodiment further has the characteristic in a connection structure between the outlet flow path part 230 and the coupling flow path part 220.

Figure 9A:
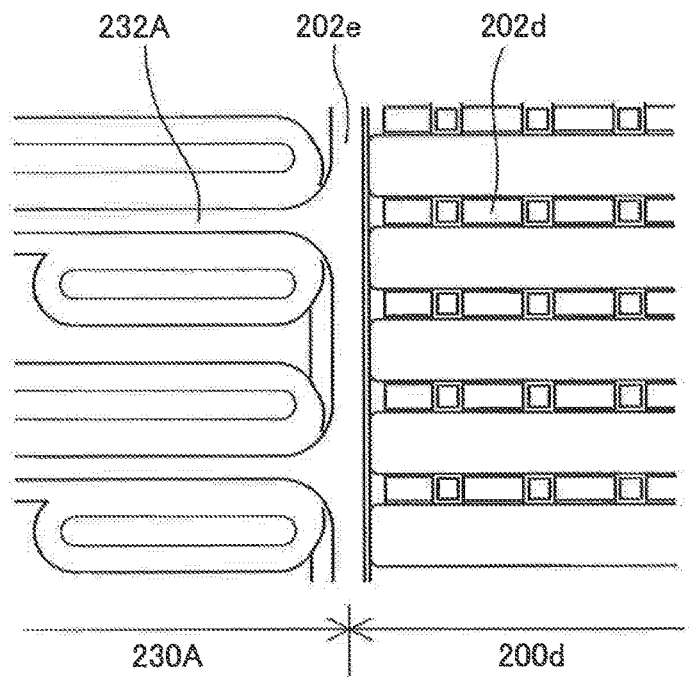
FIGS. 9A and 9B are an enlarged schematic plan view and a schematic perspective view respectively showing the structure of a part of an area including a first outlet flow path section, a boundary flow path groove, and a third coupling flow path section as viewed from a gas circulation surface side according to a second embodiment.
Figure 9B:
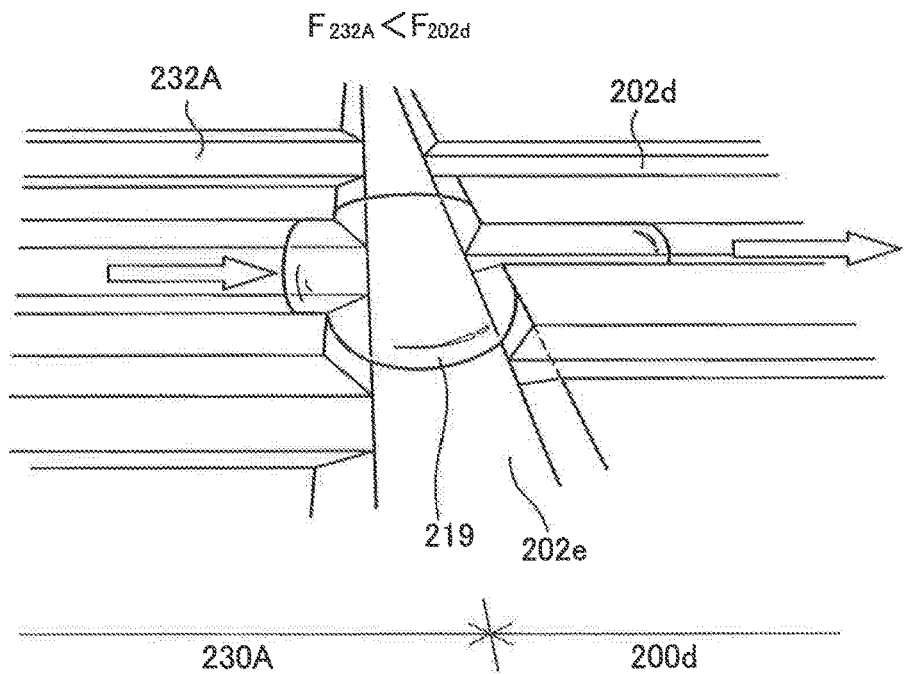

FIG. 9A is an enlarged schematic plan view showing the structure of a part of an area including the first outlet flow path section 230A, the boundary flow path groove 202e, and the third coupling flow path section 200d shown in FIG. 5 as viewed from the gas circulation surface side according to the second embodiment. FIG. 9B is a schematic perspective view of FIG. 9A.

The width and the depth of the first outlet flow path groove 232A are set in such a manner as to make capillary force $F_{232A}$ of the first outlet flow path groove 232A smaller than capillary force $F_{202d}$ of the third coupling flow path grooves 202d. More specifically, the width of the first outlet flow path groove 232A is set to be larger than the width of the third coupling flow path grooves 202d, for example.

In this case, in the presence of remaining water 219 straddling the boundary flow path groove 202e to spread over the first outlet flow path section 230A and the third coupling flow path section 200d as shown in FIG. 9B, the remaining water 219 can be moved from a direction of the first outlet flow path groove 232A toward the third coupling flow path grooves 202d by means of a difference between the capillary force $F_{202d}$ of the third coupling flow path grooves 202d and the capillary force $F_{232A}$ of the first outlet flow path groove 232A. This can reduce a possibility of blockage of the first outlet flow path groove 232A due to freezing of water staying in the first outlet flow path groove 232A.

The width and the depth of the second outlet flow path groove 232B (se FIG. 5) in the second outlet flow path section 230B may also be set in such a manner as to make capillary force (not shown in the drawings) of the second outlet flow path groove 232B smaller than the capillary force $F_{232A}$ of the first outlet flow path groove 232A.

In this case, in the presence of remaining water spreading over the second outlet flow path section 230B, the first outlet flow path section 230A, and the third coupling flow path section 200d, the remaining water in the second and first outlet flow path grooves 232B and 232A can be moved toward the third coupling flow path grooves 202d by means of differences among the capillary force of the second outlet flow path groove 232B, the capillary force $F_{232A}$ of the first outlet flow path groove 232A, and the capillary force $F_{202d}$ of the third coupling flow path grooves 202d. This can reduce the possibility of blockage of the outlet flow path part 230 due to freezing of water staying in the first and second outlet flow path sections 230A and 230B, specifically, in the outlet flow path part 230 to occur when the operation of the fuel cell 10 is started in a sub-zero temperature condition. As understood from the foregoing description, the width of the gas flow path groove in the outlet flow path part 230 is preferably set in such a manner as to make the retaining force of a wall surface of the gas flow path groove in the outlet flow path part 230 retaining water smaller than the retaining force of a wall surface of the gas flow path groove in the coupling flow path part 220 retaining the water. By doing so, the possibility of blockage of the outlet flow path part 230 due to freezing of water staying in the outlet flow path part 230 can be reduced. Unlike in the separator of the structure referred to in the description of the background art, the probability of blockage of the outlet flow path part 230 can be reduced while required capabilities such as an applicable surface pressure, characteristics of distributing gas, and pressure loss are satisfied without being damaged excessively. Additionally, like in the case of performing generally-employed process of making a surface of a flow path groove water repellent, effect of making blockage less likely is not reduced successively. Meanwhile, where appropriate, process of making a surface water repellent or hydrophilic may be also be performed in the second embodiment.

C. Modifications

In the aforementioned description of the first embodiment, the width and the depth of the first coupling flow path grooves 202b and those of the third coupling flow path grooves 202d are set to be the same with the width and the depth of the second coupling flow path grooves 202c. However, the width and the depth of the first coupling flow path grooves 202b and those of the third coupling flow path grooves 202d are not always required to be the same with the width and the depth of the second coupling flow path grooves 202c. Meanwhile, the width of the second coupling flow path grooves 202c (FIGS. 5 and 8) extending downward in a direction tilted from the direction of the gravitational force is preferably set in a manner that allows retention of remaining water against the gravitational force. More specifically, the width of the second coupling flow path grooves 202c is preferably set to fall in the range from 0.2 mm to 1.0 mm, more preferably, in the range from 0.2 mm to 0.8 mm. If the width of the second coupling flow path grooves 202c is not constant in the depth direction, an average of this width is preferably set to fall in these ranges. The depth of the second coupling flow path grooves 202c is preferably set to fall in the range from 0.2 mm to 0.8 mm, more preferably, in the range from 0.2 mm to 0.6 mm.

The aforementioned first and second embodiments describe the structure of the coupling flow path part 220 communicating with the outlet flow path part 230. A similar structure is applicable to a coupling flow path part communicating with an inlet flow path part near the fuel gas supply hole 122in.

The aforementioned first and second embodiments describe the fuel gas flow path of the anode-side separator 120. A flow path structure similar to the structure of the fuel gas flow path is applicable to an oxidizing gas flow path of a cathode-side separator.

This invention is not limited to the aforementioned embodiments, Examples, or modifications but can be implemented in various structures within a range that does not deviate from the substance of this invention. As an example, technical features in the embodiments, those in Examples, or those in the modifications corresponding to those in each of the aspects described in Summary of Invention can be replaced or combined, where appropriate, with the intention of solving some or all of the aforementioned problems or achieving some or all of the aforementioned effects. Components of the aforementioned embodiments and each of the modifications, except those described in independent claims, are additional elements and can be omitted, where appropriate.

REFERENCE SIGNS LIST

10 . . . Fuel cell
100 . . . Unit cell
120 . . . Anode-side separator
121 . . . Inner flow path forming region
122in . . . Fuel gas supply hole
122out . . . Fuel gas discharge hole
124in . . . Oxidizing gas supply hole
124out . . . Oxidizing gas discharge hole
126in . . . Cooling water supply hole
126out . . . Cooling water discharge hole
128 . . . Sealing plate
130 . . . Cathode-side separator
132in . . . Fuel gas supply hole
(not shown in drawings) . . . Fuel gas discharge hole
134in . . . Oxidizing gas supply hole
134out . . . Oxidizing gas discharge hole
136in . . . Cooling water supply hole
136out . . . Cooling water discharge hole
140 . . . Sealing member
142in . . . Fuel gas supply hole
(not shown in drawings) . . . Fuel gas discharge hole
144in . . . Oxidizing gas supply hole
144out . . . Oxidizing gas discharge hole
146in . . . Cooling water supply hole
146out . . . Cooling water discharge hole
150 . . . Gas flow path member
160E . . . Terminal plate
160F . . . Terminal plate
165E . . . Insulating plate
165F . . . Insulating plate
170E . . . End plate
170F . . . End plate
172in . . . Fuel gas supply hole
172out . . . Fuel gas discharge hole
174in . . . Oxidizing gas supply hole
174out . . . Oxidizing gas discharge hole
176in . . . Cooling water supply hole
176out . . . Cooling water discharge hole
200 . . . Fuel gas flow path
200a . . . Fuel gas flow path section
200b . . . First coupling flow path section
200c . . . Second coupling flow path section
200d . . . Third coupling flow path section
202 . . . Fuel gas flow path groove
202a . . . Fuel gas flow path groove 202*b* . . . First coupling flow path groove
202*c* . . . Second coupling flow path groove (tilted gas flow path groove portion)
202*d* . . . Third coupling flow path groove
202*e* . . . Boundary flow path groove
202Z . . . Projection
204Z . . . Cooling water flow path groove
205Z . . . Communication flow path groove
206 . . . Deep groove portion
208 . . . Shallow groove portion
210 . . . Internal flow path part
216 . . . Emboss
218 . . . Dimple
219 . . . Water (remaining water)
220 . . . Coupling flow path part
220R . . . Coupling flow path part
230 . . . Outlet flow path part
230A . . . First outlet flow path section
230B . . . Second outlet flow path section
232A . . . First outlet flow path groove
232B . . . Second outlet flow path groove
234B . . . Projection

What is claimed is:

1. A separator to be used in a fuel cell comprising:
a gas flow path including a plurality of gas flow path grooves that allow reactive gas to flow;
a gas discharge hole used for discharging the reactive gas from the gas flow path; and
an outlet flow path part positioned between the gas discharge hole and the gas flow path and used for flowing the reactive gas discharged from the gas flow path into the gas discharge hole, wherein
the plurality of gas flow path grooves includes a coupling flow path part coupled to the outlet flow path part,
the coupling flow path part includes tilted gas flow path grooves tilted from a direction of gravitational force,
a groove width of the tilted gas flow path groove in the coupling flow path part is set such that a force of a wall surface of the tilted gas flow path groove to retain water by means of a surface tension of the water is larger than a force applied to the water by the gravitational force, and
a groove width of gas flow path grooves in the outlet flow path part is set such that a force of a wall surface of the gas flow path groove in the outlet flow path part to retain water by means of a surface tension of the water is smaller than a force of a coupling-flow-path-part wall surface of an additional gas flow path groove in the coupling flow path part to retain the water.

2. A fuel cell comprising a membrane electrode assembly, a separator disposed to face the membrane electrode assembly, and a gas flow path disposed between the membrane electrode assembly and the separator for supplying reactive gas along a surface of the membrane electrode assembly, wherein
the separator includes:
the gas flow path including a plurality of gas flow path grooves that allow the reactive gas to flow;
a gas discharge hole used for discharging the reactive gas from the gas flow path; and
an outlet flow path part positioned between the gas discharge hole and the gas flow path and used for flowing the reactive gas discharged from the gas flow path into the gas discharge hole, wherein
the plurality of gas flow path grooves includes a coupling flow path part coupled to the outlet flow path part,
the coupling flow path part includes tilted gas flow path grooves tilted from a direction of gravitational force,
a groove width of the tilted gas flow path groove in the coupling flow path part is set such that a force of a wall surface of the tilted gas flow path groove to retain water by means of a surface tension of the water is larger than a force applied to the water by the gravitational force, and
a groove width of gas flow path grooves in the outlet flow path part is set such that a force of a wall surface of the gas flow path groove in the outlet flow path part to retain water by means of a surface tension of the water is smaller than a force of a coupling-flow-path-part wall surface of an additional gas flow path groove in the coupling flow path part to retain the water.

* * * * *